No. 832,914. PATENTED OCT. 9, 1906.
R. LAW.
AUTOMATIC WATER PURIFYING AND FILTRATION SYSTEM.
APPLICATION FILED JAN. 29, 1906.
2 SHEETS—SHEET 1.
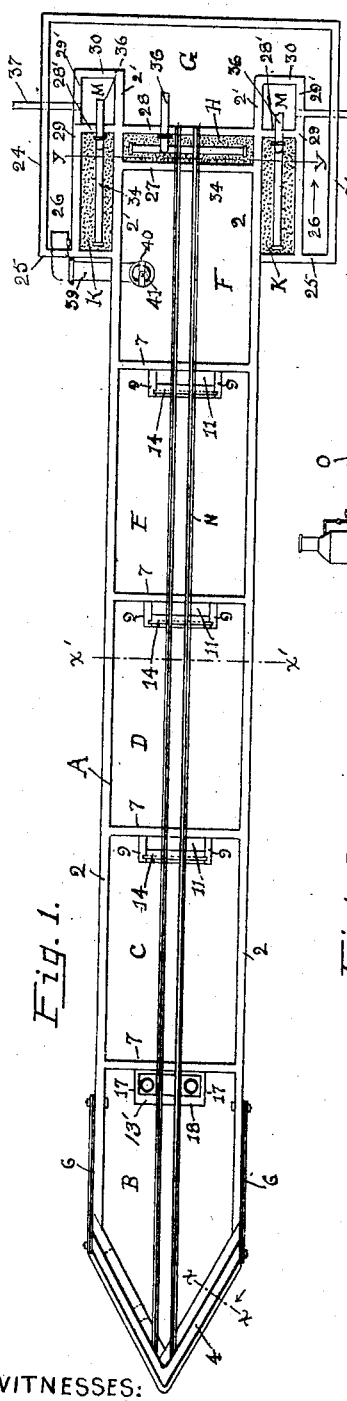
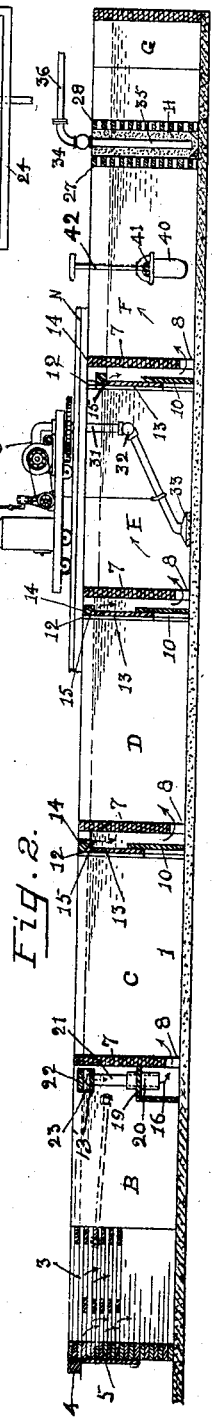
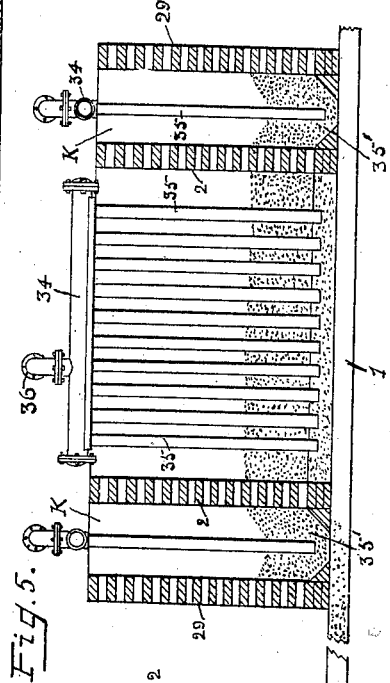
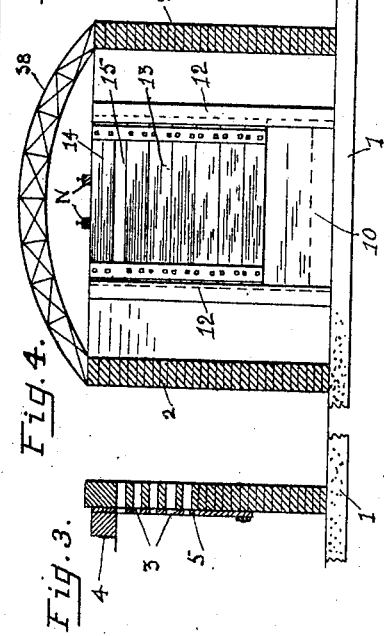
WITNESSES:
D. C. Walter
J. J. Duket
INVENTOR.
Robert Law
by Robt. B. Wilson
Attorney

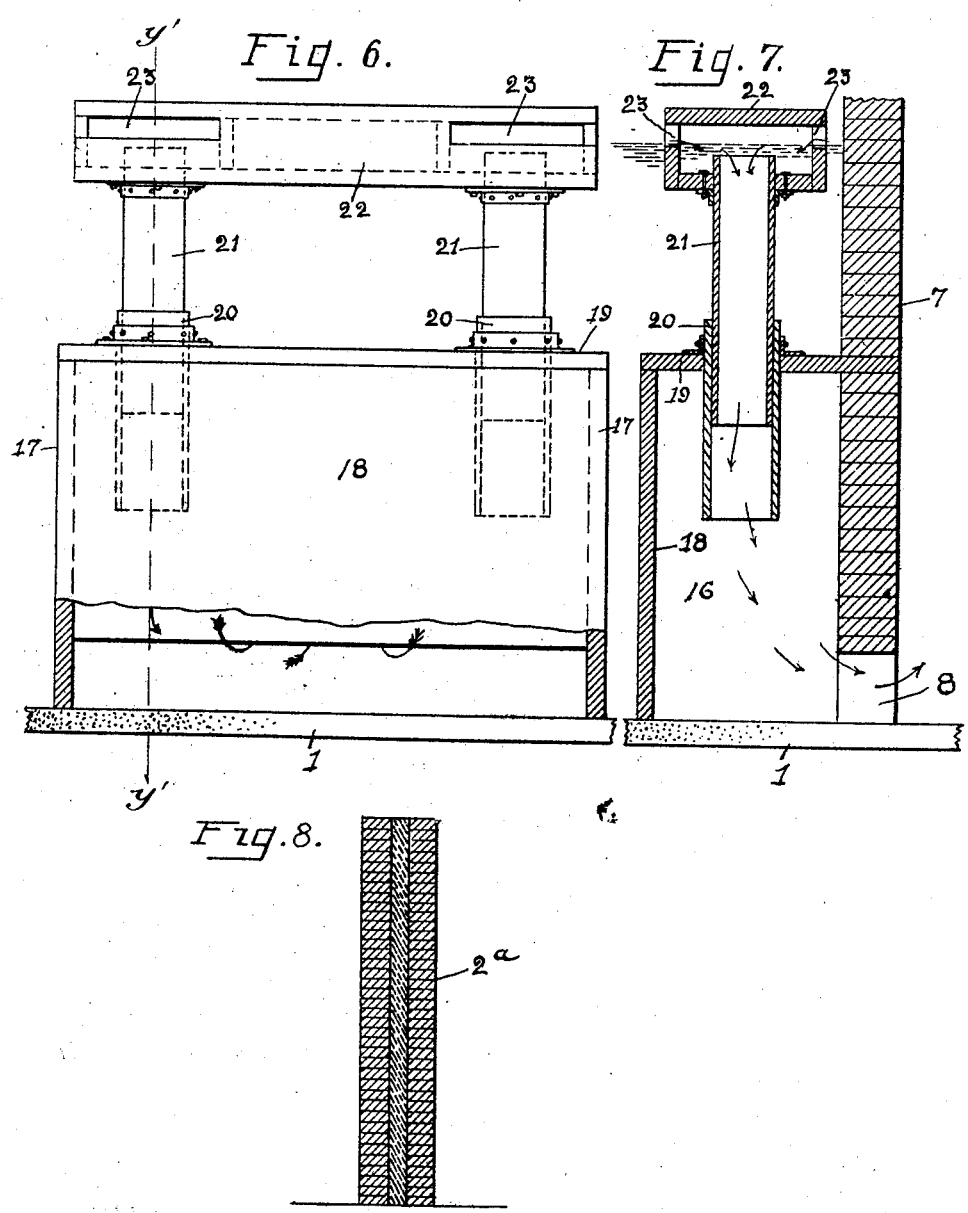

UNITED STATES PATENT OFFICE.

ROBERT LAW, OF TOLEDO, OHIO.

AUTOMATIC WATER PURIFYING AND FILTRATION SYSTEM.

No. 832,914.　　　　Specification of Letters Patent.　　　　Patented Oct. 9, 1906.

Application filed January 29, 1906. Serial No. 298,355.

*To all whom it may concern:*

Be it known that I, ROBERT LAW, a citizen of the United States, and a resident of Toledo, in the county of Lucas and State of Ohio, have invented a new and useful Improvement in Automatic Water Purifying and Filtration Systems, of which the following is a specification.

My invention relates to an automatic water purifying and filtration system, and has for its object to provide a simple and economically-constructed system of the kind and for the purpose, whereby the water-supply for towns and cities may be progressively and economically purified and filtered for use; furthermore, to provide an automatic system of the kind and for the purpose whereby a series of suitable settling basins or reservoirs are progressively supplied by natural gravitation of the water without the water having to be pumped thereto and whereby the water is progressively purified by the natural flow of the water from basin to basin, the purest water of each basin being transmitted by natural flow to the next succeeding basin until it reaches the supply-basin, from which it is pumped into the distributing-pipe system; furthermore, to provide a system of the kind having a series of basins in which the water after being coagulated by precipitants passes by natural flow through successive basins having means whereby the surface-water of a preceding basin being first automatically aerated is supplied to the next succeeding basin near its bottom, thereby causing a gentle upward spring-like movement of the water in the adjacent end of the succeeding basins that is adapted to assist in the separation of the impurities and in their deposit as sediment at the bottom of the basin, while the purer water rising to the surface passes in like manner, as described, to the next succeeding basin until it reaches the last settling-basin, from which it passes by filtration through sand or other suitable material to the supply-basin, from which it is pumped into the distributing-pipe system; furthermore, to produce an automatic system of the kind having mechanical means for readily removing the sediment from each basin and for changing the sand of each filter without interrupting the operation of the system or danger of contamination of the water in the basin; furthermore, to produce a system of the kind that is adapted to be installed in either natural or artificial bodies of water, running or still, and receive and purify the water therefrom. I accomplish these objects by constructing a water purifying and filtration system substantially as hereinafter described, and illustrated in the drawings, in which—

Figure 1 is a plan view of my invention. Fig. 2 is a longitudinal section on the center line of Fig. 1. Fig. 3 is a vertical section on line $x\,x$ of Fig. 1. Fig. 4 is a cross-section on line $x'\,x'$ of Fig. 1. Fig. 5 is a cross-section on line $y\,y$ of Fig. 1. Fig. 6 is a side elevation of a float-gate. Fig. 7 is a cross-section of the same on line $y'\,y'$ of Fig. 6. Fig. 8 is a cross-section of a modified form of crib-wall.

In the drawings, A represents a rectangular crib of suitable length and width which is built up of planks of suitable thickness and width spiked one above another in regular courses, the first or bottom course of which is laid upon water of suitable depth either in a running river or body of still water and gradually sinking by weight of the structure as the courses are added until it rests on a suitable foundation of concrete, forming a level floor for the crib.

At the receiving end of the crib the side walls 2 converge V shape, and at a suitable height above the bottom 1 alternate courses of the planking are omitted to form the intake-openings 3, which are protected by the V-shaped floating apron 4, having sides 5, (of a suitable area to cover the intake-openings,) which are connected to a V-shaped timber float at the top, that is anchored to the converging sides of the receiving end of the crib by the link-rods 6, adapting the float to rise and fall with the water. The crib A is divided by cross partition-walls 7 to form a receiving-basin B, a series of settling-basins C, D, E, and F, and a supply-basin G, from which the water is pumped into the stand-pipe' of a distributing-pipe system. (Not shown.)

The partitions 7 have suitable openings 8 near the bottom, through which the water passes from one basin to the other. Around these openings the partitions 7, between the basins C and D, D and E, and E and F, have joined thereto on the front side the wing-walls 9, projecting at right angles therefrom, and the wing-walls are connected by the gate-walls 10, parallel with the partition-walls 7 and forming therewith the gate-chambers 11. The gate-walls 10 extend only about one-half the height of the partition-walls 7 and the wing-walls 9, and opposite the ends of the wing-walls and in line therewith are provided gate-posts 12, which are grooved to receive the sliding gates 13, which are provided at their tops each with a timber float 14 and just below the top of the float with an opening 15. The gates are of a height to extend below the level of the tops of the walls 10 when the gate-float is on a level with the tops of the wing-walls 9, and the gates are adapted to pass freely but not loosely upward and downward in sliding engagement with the front faces of the walls 10 and prevent the passage of water into the chambers 11 from the respective basins in which the chambers are located, except through the openings 15. The floats 14 rest on the water in their respective chambers 11 and have such displacement that the lower edges of their openings 15 are submerged slightly below the level of the water in their respective chambers 11, so that when the water in a chamber is at a common level with the water in the next preceding basin the lower edge of the opening 15 of the gate of such chamber is slightly below the level of the water in the preceding basin; but if the level of the water in a chamber is lowered below the level of the water in the next preceding basin the opening 15, while it retains its relation to the level of the water in the chamber, is submerged below the level of the water in the basin a distance equal to the difference between the water-levels of the chamber and the basin, whereby the quantity of water flowing through the opening is increased and a fall of water from the basin into the chamber equal to such difference of the level of the basin and the chamber is established. The openings 15 are each of suitable vertical width between their upper and lower edges to admit varying volumes of water up to its full capacity according to the depth of submergence of the lower edge of the opening below the level of the water in the preceding basin. While the basin B may also be provided with a chamber 11, having a gate 13, it is preferably provided with a chamber 16, formed of wing-walls 17 and a front wall 18 of equal height and provided with a top closure 19, having mounted vertically therein at each end portion the tubular guides 20, into which are telescopically inserted the pipes 21, which are attached at their upper ends to a float 22, which is provided with side openings 23, into which the upper ends of the pipes extend, the pipes 21 and the float 22 forming a gate 13', which is supported on and raised and lowered by the water in basin B. The float 22 holds the upper ends of the pipes 21 submerged just below the level of the water in the basin B, so that only surface water therefrom passes from the basin B to the basin C through the pipes 21, the chamber 16, and the opening 8 from the chamber 16 to the basin C. The pipes 21 thus submerged are of a capacity to supply a volume of water equal to the full capacity of each of the openings 15 of the gates 13, and by reason of this increased capacity the level of the water in basin C remains constant with the level of the source in basin B. When the receiving-basin B is provided with a gate 13' thus constructed, the basin C constitutes the first settling-basin of the series; but if basin B is provided with a gate 13 it may be used as the first settling-basin. The basin G is of increased width, and its side walls 24 extend part of their length parallel with the side walls 2, to which they are connected by the walls 25, forming side extensions 26 of the main basin.

Basin F is separated from the basin G by the parallel partition-walls 27 and 28 at the rear end and by the side walls 2 and the walls 29 on the sides, the side walls 2 from the walls 25 rearward to the partition-walls 27, the walls 29, and the partition-walls 27 and 28 each having portions of alternate courses of the planking omitted, as shown in Fig. 5. The partition-wall 28 is provided with solid extensions 28', which intersect the walls 29. The chambers formed by the side walls 2 and the partition-walls 27 and 28 and by the side walls 2 and 29 and the end walls 25 and 28' being filled with sand or other suitable filtering material form the end filter-screen H and the side filter-screens K, through which all the water received in the supply-basin G is filtered from the basin F. Preferably, the walls 2 and 29 are provided with the solid extensions 2' and 29', which are connected by the end walls 30 to form the cleansing-chambers M for the filtering material. Central and lengthwise of the top of the crib there is preferably provided a track N, upon which is mounted the car O, provided with a boiler, engine, and a suction-pump adapted to be operated by the engine. The pump is provided with a pipe 31, having a universal joint 32, by which the lower end portion, having attached thereto the suction-head 33, may be moved about over all parts of the floor of the crib.

The crib A being thus constructed and located in water of suitable depth, the operation is as follows: The water enters the basin B by natural flow through openings in the V-shaped head end of the crib, the floating apron 4 forming a guard that diverts and prevents any substance or material floating on the water from entering through or choking up the openings. The inlet-openings being of greater capacity than the outlet-opening in the gate of basin B, the basin will fill up to the level of the water outside the crib, the gate rising with the water in the basin. The basins C, D, E, F, and G will successively fill up each by overflow from the next preceding basin, the surface water from each passing through the gate-openings in falls which are adapted to aerate it and through the bottom openings of the gate-chambers, thereby producing that natural buoyant action of the water that occurs in springs and which facilitates precipitation, the water becoming gradually purified as it passes from basin to basin and any remaining impurities being eliminated by filtration from the basin F to the basin G, through the filter-screens H and K. It is manifest that if no water is pumped from basin G into the distributing system the water in each basin of the series will successively reach the level of the source; but if water is pumped from basin G the level of the water in the basin F will be reduced, thereby lowering the gate 13 of the basin E, which will produce a flow from the basin E and a lowering of the level of the basin E, that will lower the gate of and produce a flow from the basin D, and the lowering of the level of the basin D will lower the gate of and produce a flow from the basin C, and thereby establish a gradation of levels between the basin C and the basin F, with the lower edges of the openings 15 of the several gates slightly below the levels of their respective basins, whereby there will be a surface flow and fall of water from each basin into its chamber 11 and a welling-up movement of water from each chamber through the openings 8 into the next succeeding basin, and it is also apparent that the quantity of water so passing from each preceding basin to each succeeding basin of the series will equal the quantity withdrawn from the basin G and that if the quantity pumped into the distributing system is increased the gates will be lowered proportionately to the increased demand and the quantity flowing through the openings 15 will be proportionately increased until the demand equals the full capacity of the openings, which are preferably made of such capacity as to meet an emergency demand far in excess of the ordinary and normal demand of the distributing system. It will thus be seen that my system is adapted to automatically supply water to the pumps of the distributing system, according to the demand, between a normal minimum and a predetermined maximum quantity. Each basin excepting the first being supplied from the surface water of the preceding basin and the surface water having always the least sediment it is manifest that each succeeding basin of the series will be freer from sediment than the preceding and that substantially all of the heavier sediment will be deposited in the receiving-basin B and the basin C. Preferably, therefore, where coagulants and precipitants are necessary to destroy and settle out of the water any dangerous germs that may remain therein they are used in the basins D and E. However, where the water is free from heavy sediment the reagents may be used in the basins B and C.

From time to time, as required, the sediment deposited on the floors of the several basins may be readily removed by the suction pump of the car O, without contaminating the water in the respective basins or interrupting the operation of the system. To change the sand or other filtering material from time to time, as required, without interrupting the filtration, the filtering-chambers H and K are provided with the main pipes 34, having the branch pipes 35, which extend into the V-shaped bottom 35' of the chambers, as shown in Fig. 5. The pipes 34 extend central and longitudinally over the tops of the chambers H and K and have the discharging branches 36, which are adapted to be so connected as to either discharge the sand from the chambers into the cleansing-chambers M or outside the crib. When the sand is to be changed, a hopper (not shown) of suitable size to hold a charge for filling the chamber is mounted on the walls of the chamber and filled. The suction-pump of the car O is then suitably attached to the main pipe 34 of that chamber and operated until the old charge is discharged into a cleansing-chamber M, previously filled with clear water from the basin G. The sand of the old charge being withdrawn from the bottom of the chamber through the branch pipes 35, the new charge in the hopper sinks into the chamber, replacing the old as fast as the old charge is withdrawn. The old charge being discharged into the chamber M filled with clear water, is thereby cleansed in passing through the water, which, being displaced by the sand, rises and is discharged through the pipe 37 outside the walls of the crib. After being cleansed the sand of the first charge may be drawn from the chamber M by the pump and discharged into the hopper ready to be used to replace the second charge whenever conditions require. Each chamber H and K being provided with a hopper holding a second charge, the sand in each chamber may be thus changed and cleansed as often as the condition of the charge in use may require, and it is manifest that in this way the filtration-beds may be kept pure and fresh without any interruption of the operation of the system and without any contamination of the water-supply during the process.

While natural sand may be used in the chambers H and K for forming the filter-screens, I preferably use an artificial sand formed of uncalcined gypsum rock crushed into grains of about equal fineness with common sand, from which has been screened all finer particles, as I find that gypsum beds thus formed are specially well adapted for the purification of water passing through them. I also prefer to use finely-ground calcined gypsum rock as a coagulant and precipitant, as I have found that it is peculiarly well adapted to such purpose, having high efficiency both as a coagulant and a precipitant and having the effect to soften the water without any liability of producing dangerous results from excessive use. However, I do not limit myself solely to its use for that purpose, as my system is adapted to the use of any of the reagents commonly employed for the purpose. The crib A may be provided with any suitable roof; but I prefer to use a roof supported by trussed arches 38 springing from the sides 2, as shown in Fig. 4. Preferably the basin F is provided with a discharge-pipe 39, having a vertical portion 40, which extends a suitable distance above the floor 1 and is provided with a closure-valve 41. The pipe 39 extends through the adjacent side wall 2 and through a wall 25 into the end of a side extension 26 of the supply-basin G. Thus connected, in case of a fire requiring an unusual supply to be pumped into the distributing-pipe system from the basin G greater than the capacity of the filter-screens the valve 41 is opened by the stem 42, thereby permitting water to flow from the basin F to the basin G temporarily through the pipe 39 as well as through the screens as long as the increased demand requires, which being supplied the valve 41 is again closed. By so connecting the last settling-basin of the series, the water of which is substantially purified, my system is made adapted to provide the increased supply required for fire purposes without the necessity of temporarily pumping into the distributing system water direct from impure sources.

While I have shown the wall-basins constructed of timber, it is obvious they may be constructed of concrete or other material without changing the principle of operation of my invention. In Fig. 8 is shown a double wall 2ᵃ of planking, having the intervening space filled in with concrete, which is a desirable and economical form of construction for the walls.

By reason of the location of the crib A in the source of supply much lighter walls are practical to hold the weight and pressure of water by reason of the outer and inner pressure being always, whatever the level of the water in the source, nearly equalized on all the walls, and a further economical advantage is obtained by such location in utilizing the natural flow of the water as a means of supply instead of pumps. Where there is no river or natural body of water of sufficient depth, the crib may be located in an artificial body of water having walls dividing it into separate reservoirs each opening into a common reservoir in which the crib is located, whereby one or more of the divisions may be emptied at times for removing sediment therefrom without interruption of the operation of the system. The series of settling-basins of my system may be of any suitable number and capacity without affecting its automatic operation.

What I claim to be new is—

1. In a water-purifying system, the combination with a water-supply source of varying level, of a series of settling-basins, the first basin of the series being adapted to receive water by natural flow from the supply source until filled to a common level with the source, and means to automatically supply each succeeding basin of the series at or near the bottom with the surface water only of the next preceding basin, and whereby a reduction of the level of the water in the last basin below the level of the source automatically produces a gradation of levels of the intermediate basins between the level of the source in the first basin and the level of the last basin, and a surface flow and fall of water from each preceding basin into the bottom portion of the next succeeding basin.

2. In a water-purifying system, the combination with a water-supply source of varying level, of a series of settling-basins, the first basin of the series being adapted to receive water by natural flow from the supply source until filled to a common level with the source, means to automatically supply each succeeding basin of the series at or near the bottom with the surface water only of the next preceding basin, and whereby a reduction of the level of the water in the last basin below the level of the source automatically produces a gradation of levels of the intermediate basins between the level of the source in the first basin and the level of the last basin, and a surface flow and fall of water from each preceding basin into the bottom portion of the next succeeding basin, and a supply-basin connected to the last settling-basin by one or more filter-screens substantially as set forth.

3. In a water-purifying system, the combination with a water-supply source of varying level, of a series of settling-basins, and a supply-basin for a distributing system formed by cross partition-walls subdividing an elongated main basin, the first basin of the series being adapted to receive water at one end by natural flow from the supply source until filled to a common level with the source, the cross-walls between the settling-basins being each provided with a chamber having an opening for a gate at the top portion into the next preceding basin, and an opening at the bottom into the next succeeding basin, a float-gate for each gate-opening movable upward and downward therein and adapted to automatically close the opening up to the level of the water in the next preceding basin, each gate being supported on the water in the chamber by a float having an opening near the top adapted to establish a flow and fall of the surface water of the next preceding basin into the top of the chamber, and thence through the bottom opening of the chamber into the next succeeding basin, said float-gates being adapted to establish a gradation of levels between the first and the last settling-basin of the series, and to automatically operate as set forth when the water-level of the supply-basin is below the level of the source.

4. In a water purifying and filtering system, the combination with a basin of a partition dividing the basin comprising contiguous foraminate walls, filtering material filling the chamber between the partition-walls, and means to simultaneously withdraw filtering material from the bottom and supply an equal quantity at the top of the chamber substantially as and for the purpose set forth.

5. In a water purifying and filtering system, the combination with a basin of a partition dividing the basin, comprising contiguous foraminate walls, a main suction-pipe extending lengthwise of the top of the chamber, a series of branch pipes connected at close intervals to the main pipe and extending therefrom into the bottom portion of the chamber, and means to draw filtering material from the bottom of the chamber through the branch pipes and the main pipe, substantially as set forth.

6. In a water purifying and filtering system, a basin having walls partly submerged in a source of water-supply, openings in a wall or walls of the basin below the level of the source and a floating apron in front of the openings, substantially as and for the purpose set forth.

7. In a water purifying and filtering system, the combination with a basin of a filter-screen comprising open walls forming a partition of the basin, and a chamber between the walls, and filtering material in the chamber, a walled cleansing-chamber adapted to be filled with water, a waste-pipe near the top of the cleansing-chamber, and means to draw filtering material from the bottom of the filtering-chamber and discharge it into the cleansing-chamber, substantially as and for the purpose set forth.

In witness whereof I have hereunto signed my name, in the presence of two subscribing witnesses, this 24th day of January, 1906.

ROBERT LAW.

In presence of—
   FRANKLIN S. MACOMBER,
   LOUISE BLAIR.